United States Patent Office 2,984,196
Patented May 16, 1961

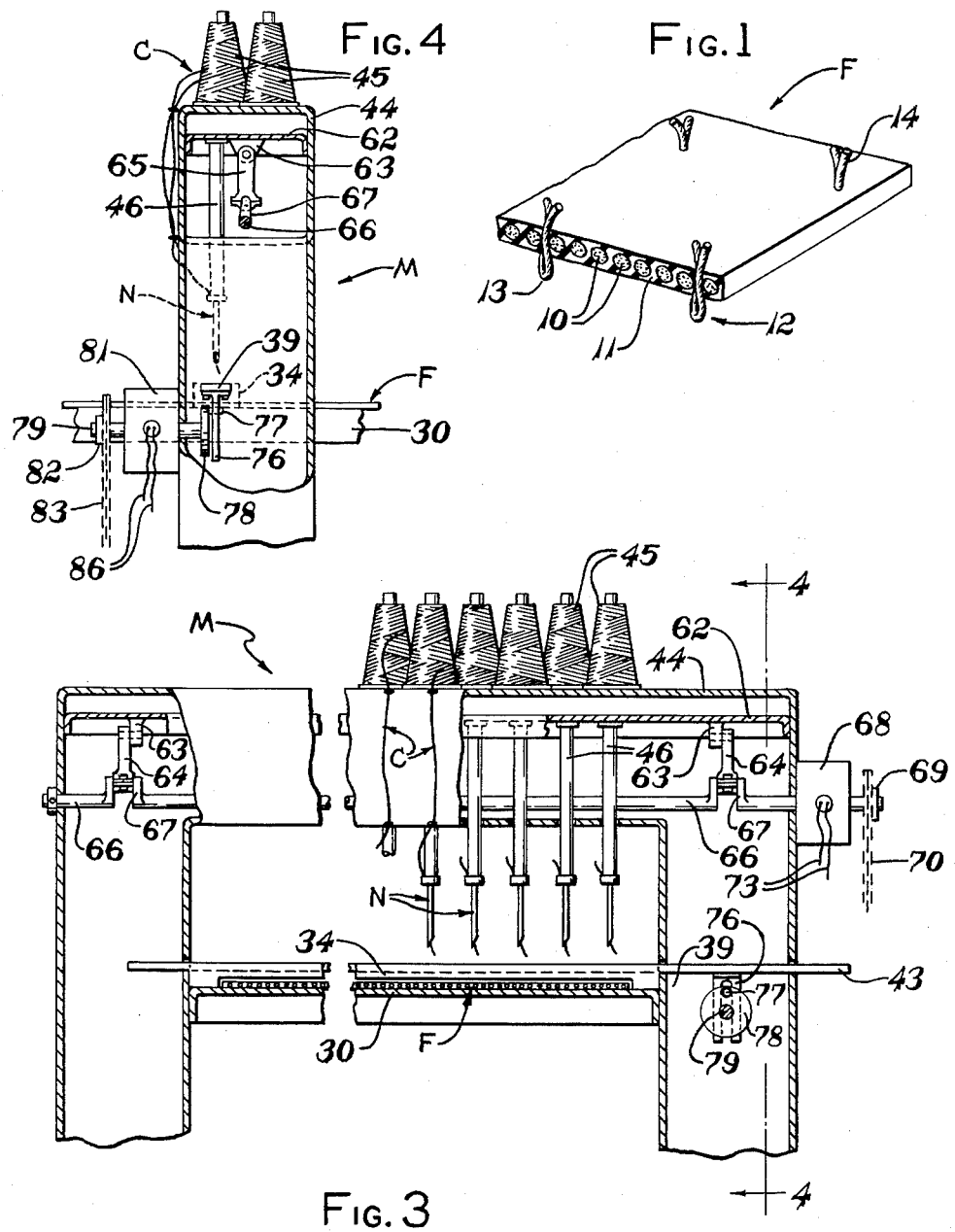

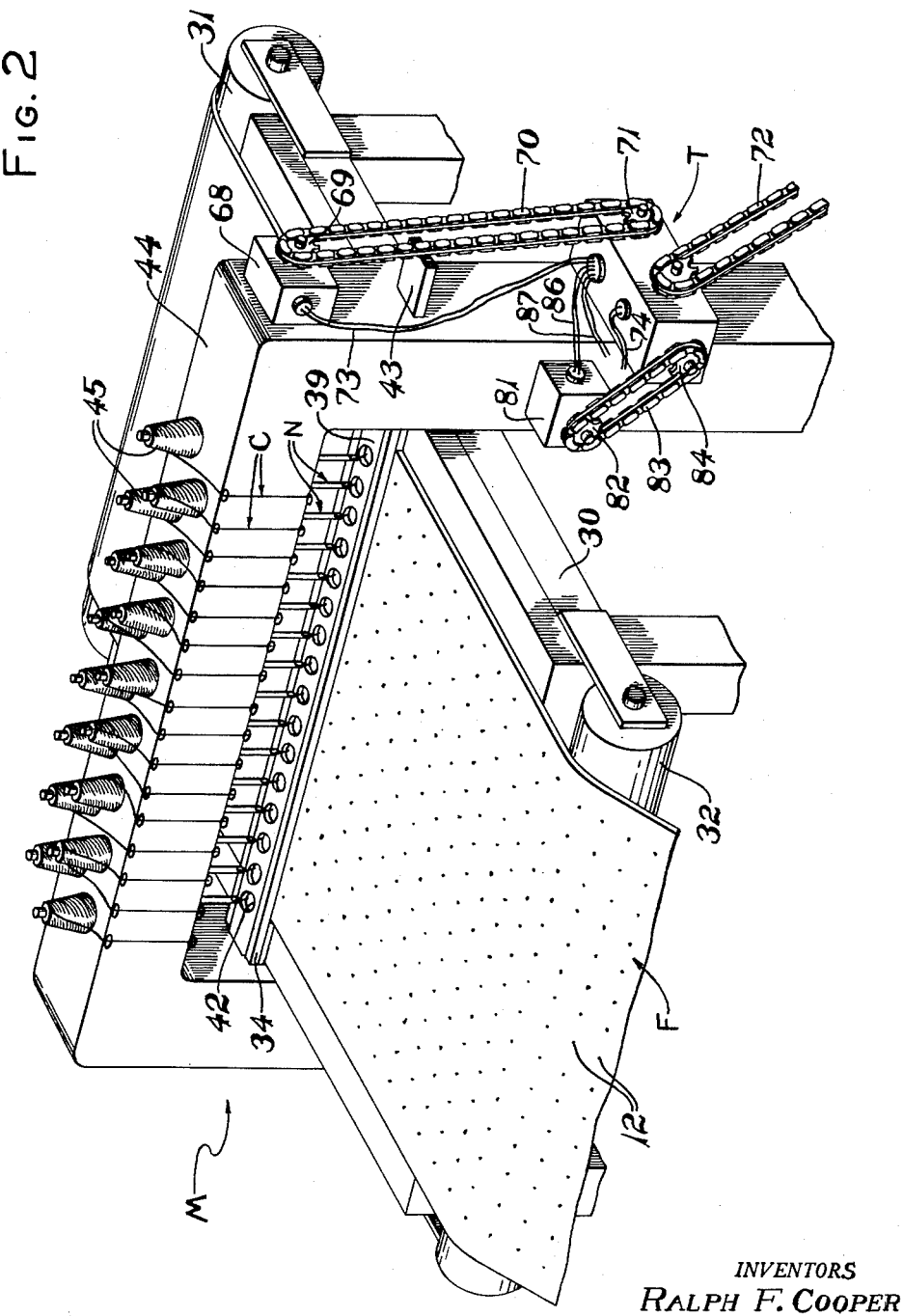

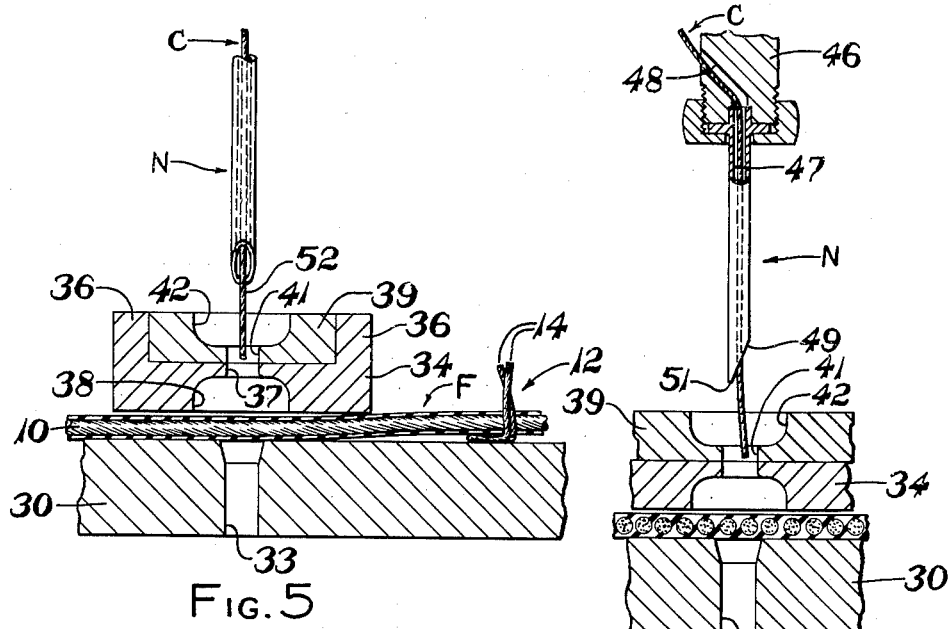
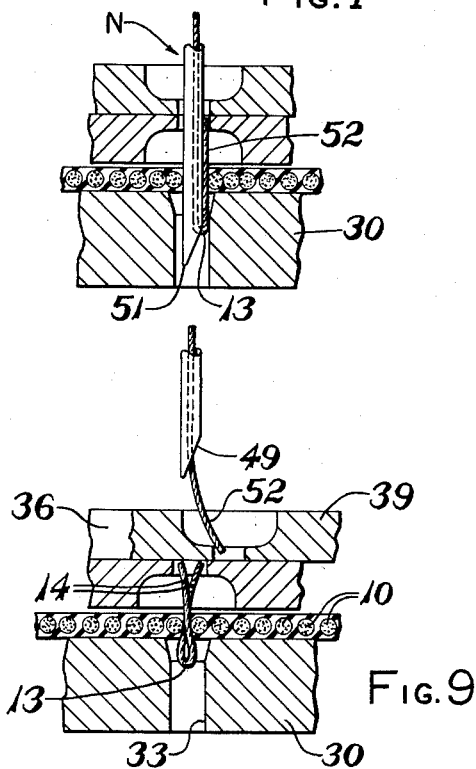
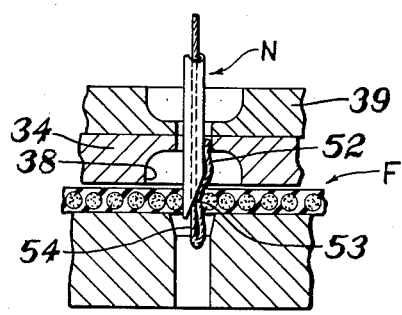

2,984,196
APPARATUS FOR APPLYING VENT YARNS TO RUBBERIZED FABRIC

Ralph F. Cooper and John R. Yoho, Akron, Ohio, assignors to The B. F. Goodrich Company, New York, N.Y., a corporation of New York Filed Dec. 18, 1957, Ser. No. 703,687

4 Claims. (Cl. 112—79)

This invention relates to the manufacture of articles formed by lamination of plies of rubberized fabric such as rubberized cord fabric. Such fabric is commonly employed in manufacture of tires, hose, belts, and many other articles. The fabric is customarily formed by masticating natural or synthetic rubber and calendering the masticated rubber directly on to elongated tension cords which are parallel to one another and disposed side by side. The rubber fills any spaces that may originally exist between the cords and also a light coat of rubber is left over the outside surfaces of the cords to form a sheet of rubberized fabric that is cut and built into the various articles referred to.

For example, in building a pneumatic tire the rubberized fabric is bias cut into cord plies. There are wrapped around and laminated upon one another on a tire building drum. During the building operation, the plies are successively stitched down to eliminate air blisters and produce initial adhesion. Often, however, air is trapped between adjacent faces of the plies and the stitching operation does not entirely expel or remove the trapped air. This may produce poor adhesion and blisters resulting in defective final products. Also, in some cases, gases are generated during the cure which, if not vented, may tend to cause separation between the ply laminations.

In the copending application of Arthur Kelly, Serial No. 703,688, filed December 18, 1957, now patent No. 2,973,799, it is proposed to vent the rubberized fabric by means of short lengths of textile fibers that extend entirely through the fabric with ends that project past the faces of the fabric. When such a fabric is formed into plies, as on a tire-building drum, air trapped between the plies can pass directly through the rubberized fabric plies and find its way to the atmosphere. These wicking or bleeding textile fibers are formed of relatively short lengths of material like the usual bleeding yarn, which is preferably a soft, small-diameter cotton yarn that readily wicks or conducts air.

In the preferred form of the aforesaid copending application, the bleeder yarns are in the form of short loops extending through the fabric between adjacent cords. This invention relates to apparatus for rapidly applying such vent loops of yarn to the rubberized fabric. Briefly, this is accomplished by intermittently feeding a strip of rubberized cord fabric over a table having a row of holes therein. A pair of relatively movable shear bars is disposed above the row of holes, each bar also having a row of holes, one bar being fixed with its holes in alignment with those of the table, the other bar sliding along the fixed bar and having a row of holes that may be brought into and out of alignment with the holes of the fixed bar to act as a shear.

The loops of yarn are applied by a row of hollow needles aligned for reciprocation into and out of said rows of holes. The ends of the needles are beveled so that on withdrawal the cords of the fabric grip the loop and hold it while the needles are drawn clear. The shear then operates to sever the upstanding lengths of cord from the needles, leaving the vent loops in the fabric.

The manner in which one skilled in the art may practice this invention will be apparent from the following detailed description of a preferred embodiment thereof.

In the drawings:

Fig. 1 is an enlarged partial section of a rubberized fabric embodying the invention;

Fig. 2 is a view of the apparatus of the invention;

Fig. 3 is a fragmentary cross-section, partially in elevation and partially in transverse section through the apparatus;

Fig. 4 is a section taken on line 4—4 of Fig. 3;

Fig. 5 is a fragmentary cross-section through the work station of the apparatus; and Figs. 6–9 are views similar to Fig. 5 showing successive steps in the operation of the apparatus.

Referring to Fig. 1, an enlarged fragmentary section of a piece of rubberized fabric F is shown. The fabric comprises a layer of elongated parallel cords 10 which cords are commonly formed of cotton, rayon, nylon, wire or other tensile material. The cords are coated with rubber in a calender, the rubber usually having been previously masticated to place it in a plastic state. The coat of rubber 11 not only fills any spaces that may exist between the cords, but also provides a thin layer or skin of rubber that covers the cords. The cords may or may not have been woven with small wefts to hold them in place before the calendering operation, the presence or absence of the wefts having no effect upon the invention.

The venting yarns 12 are in the form of short loops of .010″ diameter cotton yarn the loops having a bight or looped end 13 on one side of the fabric sheet and free ends 14 on the other side. The loops are applied so as to extend between the cords of the rubber material and the cords firmly grip the loops by friction, this being particularly true since the rubber material is somewhat tacky at this stage.

Referring to Figs. 2–9, the machine M includes a table 30 with fabric guide rollers 31 and 32 at opposite ends thereof, the fabric being trained from roll 31 across the table to roll 32 after which it is wound on a combiniation indexing and wind-up roll not shown. A transverse row of holes 33 pierce the table. A lower shear bar 34 extends across the table and is mounted to bridge the sheet of fabric F being vented. This bar has outstanding guides 36 and a row of apertures 37 in alignment with the table apertures 33 each terminating in a mouth 38. Sliding on the lower shear bar 34 is an upper, movable shear bar 39 which also has a row of holes 41 symmetrical with the holes 37 in the lower bar. These holes each have an enlarged entrance mouth 42. The upper shear bar 39 has an extension 43 at one end for connection to a reciprocating mechanism. Extending above the shear bars and across the table is a metal housing 44 which contains a mechanism for mounting and vertically reciprocating a row of hollow needles N, there being one needle for each group of holes on the bars and table. Strands of the venting yarn C are wound on spools 45 and guided through the hollow needles. As seen in Fig. 6, each needle is mounted in a shank 46 and has an axial aperture 47. There is also an aperture 48 in the shank for threading the yarn from the spool into the needle. The needle has a beveled tip 49, and the point of the needle is rounded as at 51, so that when the needle extends into the fabric the cords will be deflected and not pierced by the needle. The needles are of .042″ outside diameter with a hole of .025″ diameter when using .010″ diameter yarn. The rounded end 51 has a radius of .005″. The beveled end of the needle forms an acute angle of 75°.

As seen in Figs. 3 and 4, the needle support shanks 46 are mounted on a vertically reciprocable cross plate 62 having ears 63 near each end pinned to connecting rods 64 operated by crank shaft 66 formed with a pair of cranks 67. The shaft 66 is driven by a solenoid tripped one revolution clutch 68, the details of which are not shown, such clutches being well-known in the machine element art. The driving plate of the clutch is constantly driven by sprocket 69, chain 70 and sprocket 71, the latter being driven from a gear box having a main drive 72. The details of the gearing are not essential to the invention and are not shown. The gear box T incorporates a timing switch that energizes leads 73 that energize the solenoid for clutch 68, the details of the timing switch forming no part of the invention. Of course, the timing switch has power input leads 74.

In order to reciprocate the shear bar 39, extension 43 has a depending slotted arm 76 driven by a pin 77 in disc 78 rotated by shaft 79. Shaft 79 is intermittently rotated through another one revolution clutch 81 having a constantly rotating drive sprocket 82 connected by chain 83 to a timer sprocket 84. The solenoid for the clutch connects to the timer by leads 86. Leads 87 from the timer connect to a solenoid for controlling the automatic wind-up mechanism, not shown.

The operation of the apparatus will be described with reference to Figs. 5–9. At the beginning of an operation, the needle is positioned as shown in Figs. 5 and 6 and the fabric wind-up mechanism will have advanced the fabric to a position ready for insertion of a row of vent yarns. A length 52 of venting yarn will be depending from the needle as the result of the previous operation. The shear bar 39 will have been positioned so that its holes are in alignment with those of the lower bar and the table.

As seen in Fig. 8, the needle reciprocating mechanism is actuated to cause the needle to descend and pierce the fabric, the needle contour, that is, the rounded tip and the beveled end, insuring that the needle passes between two cords. As soon as the needle enters the fabric, the length 52 is gripped between one rubber cord and the needle resulting in a sharp bend or bight 54 in the yarn at the end of the needle. Continued advance of the needle pulls the length 52 of yarn into the fabric until the descent of the needle is arrested which is the condition shown in Fig. 7. The reciprocating machine now raises the needle but as the needle is raised to a position wherein the beveled end begins to pass out of the fabric as seen in Fig. 8, the friction of the rubberized cords at zone 53 against the short length of yarn 52 holds the loop in place in the fabric as the hollow needle is withdrawn. In other words, it is easier for the needle to slide over the length of yarn extending through it than it is for the needle to pull the loop of yarn back up between a pair of cords. Thus, as seen in Fig. 9, when the needle leaves the fabric the two lengths of yarn forming the loop remain gripped at zone 53 by the fabric.

As seen in Fig. 9, when the needle has cleared the upper shear bar 39, the latter is shifted relative to the lower bar and the edges of the aperture 37 and 41 shear length 52 depending from the needle. This leaves the originally described two free ends of yarn 14 originally shown in Fig. 1 joined by loop 13, and a new length of yarn 52 is left depending from the needle, which length is determined by the amount the needle is lifted before the shearing operation begins.

The upper shear bar is then returned to its alignment position, the fabric is indexed again, and the operation repeated. Since the material which the cords are embedded in is normally quite tacky, the cords are firmly gripped and will not be pulled loose during the advance of the fabric over the table and during subsequent handling.

Thus, it can be seen that through-venting of rubberized fabric is obtained by the apparatus of our invention and that such yarns can be readily applied and will remain in place during subsequent article building operations utilizing the vented fabric.

Having completed a detailed description of a preferred embodiment of our invention so that those skilled in the art may practice the same, we claim:

1. Apparatus for applying loops of vent yarns to rubberized cord fabric comprising a table having a planar surface provided with a row of apertures, a fixed shear plate bridging said table in spaced parallel relationship thereto for passage of the fabric in flat condition between the plate and the table, the said plate having a row of apertures aligned with those in the table, a movable shear plate supported for reciprocation adjacent to and parallel with said fixed shear plate and having a row of apertures movable to and from alignment with those of the fixed shear plate, a row of needles mounted on the same side of said table as said shear plates and in alignment with the apertures of the table, the said needles each being adapted to have a vent yarn threaded therein, means to reciprocate said needles through all said apertures when those in the movable shear plate are aligned with the corresponding apertures in the fixed shear plate and table to thereby form loops of yarn in the fabric disposed on said table beneath said fixed shear plate, and means to reciprocate said movable shear plate when the said needles are removed from said apertures to clip off the loops from the body of yarn threaded in said needles.

2. Apparatus for applying loops of vent yarns to rubberized cord fabric comprising a table having a planar surface provided with a row of apertures, a fixed shear plate bridging said table in spaced relationship thereto for passage of the fabric in flat condition between the plate and the table, the said plate having a row of apertures aligned with those in the table, a movable shear plate supported on said fixed shear plate for reciprocation parallel thereto with the said movable shear plate having a row of apertures movable to and from alignment with those of the fixed shear plate, a row of hollow needles mounted on the same side of said table as said shear plates and in alignment with the apertures of the table, said needles each being adapted to have a vent yarn threaded therethrough, means to reciprocate said needles through said apertures when those in the movable shear plate are aligned with the corresponding apertures in the fixed shear plate and table to thereby form loops of yarn in fabric disposed on said table beneath the fixed shear plate, and means to reciprocate said movable shear plate when the said needles are removed from the said apertures to clip off the loops from the body of the yarn threaded through said needles.

3. Apparatus as defined in claim 2 wherein the said needles have the fabric penetrating ends thereof beveled with the edges of the beveled point of each needle rounded.

4. Apparatus for applying vent yarns to rubberized cord fabric comprising a fabric supporting table having a horizontal fabric supporting surface provided with a row of apertures, a fixed shear plate supported on said table in spaced relationship thereto for passage of the fabric in flat condition between the table and the plate, the said plate having a row of apertures aligned with those in the table, a movable shear plate supported on said fixed shear plate for reciprocation parallel to the latter, the said movable shear plate having a row of apertures movable to and from alignment with those of the fixed shear plate, a row of hollow needles mounted on the same side of said table as said shear plates and in alignment with the apertures of the table, the said needles each being adapted to have a vent yarn threaded therethrough, means to reciprocate said needles through all said apertures when the latter are in alignment, means to reciprocate said movable shear plate, and timing means automatically correlating the reciprocation of said needles with that of said shear plate, whereby fabric placed between said table and fixed shear plate is penetrated by the needles with the yarn carried by the latter forming loops on the table side of the fabric and the said yarns are severed adjacent the other side of the fabric.

References Cited in the file of this patent

UNITED STATES PATENTS

| | | |
|---|---|---|
| 527,971 | Grubb | Oct. 23, 1894 |
| 1,832,559 | Johnston | Nov. 17, 1931 |
| 1,874,588 | Ogden | Aug. 30, 1932 |
| 1,911,445 | Gladish | May 30, 1933 |
| 1,917,334 | Smith | July 11, 1933 |
| 1,970,703 | Loos | Aug. 21, 1934 |
| 2,213,589 | Montgomery | Sept. 3, 1940 |
| 2,330,615 | Parker | Sept. 28, 1943 |
| 2,636,460 | Seiderman | Apr. 28, 1953 |
| 2,707,927 | Artzt et al. | May 10, 1955 |

FOREIGN PATENTS

| | | |
|---|---|---|
| 503,779 | Germany | July 29, 1930 |